(No Model.)
A. B. BROWNE & E. D. CHAPLIN.
APPARATUS FOR MANUFACTURING WHITE LEAD BY ELECTROLYSIS.
No. 551,361. Patented Dec. 17, 1895.
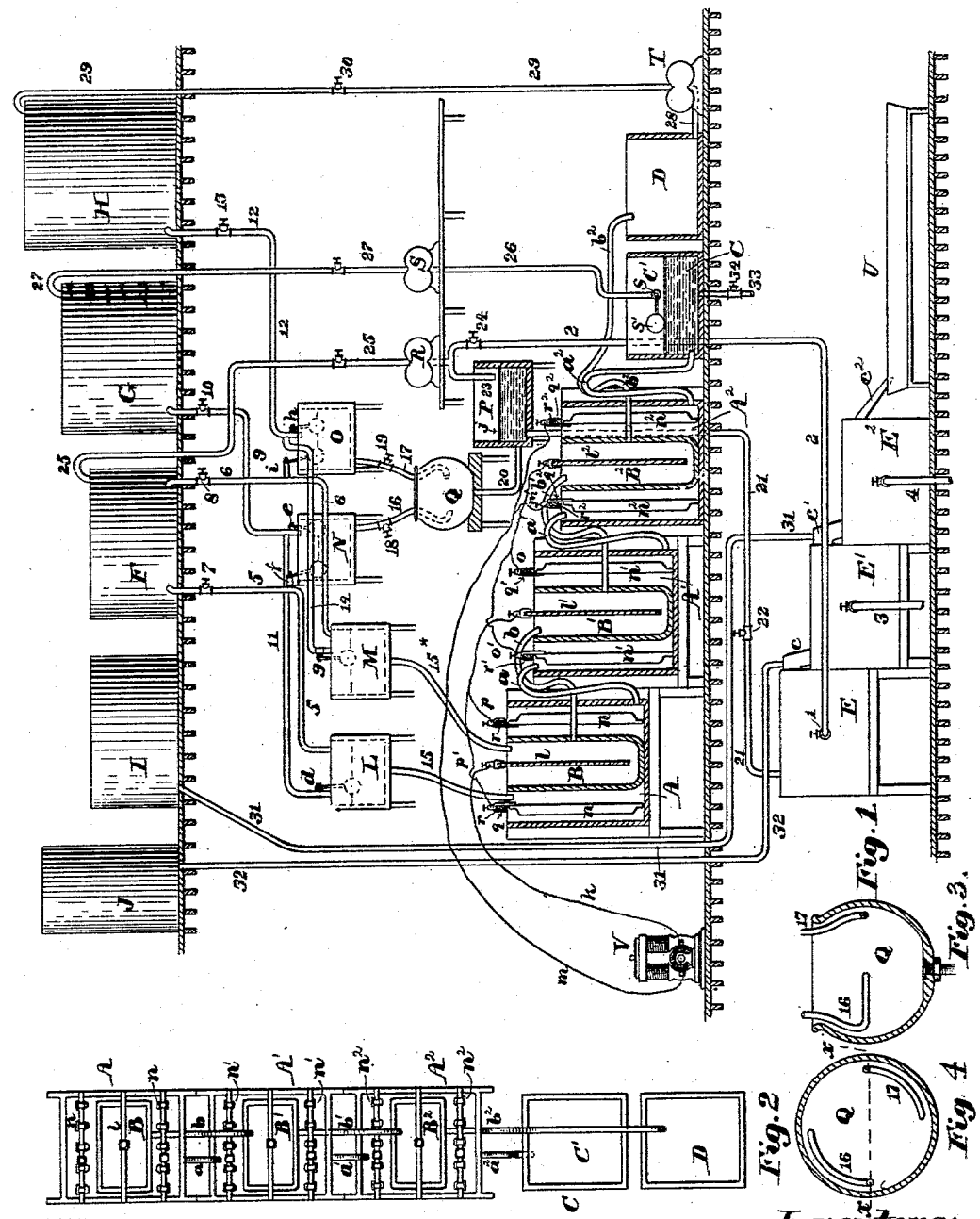
Witnesses:
Walter E. Lombard
H. Theodore Fletcher
Inventors:
Arthur Benj. Browne,
Edwin D. Chaplin,
by N. C. Lombard
Attorney.

UNITED STATES PATENT OFFICE.

ARTHUR BENJ. BROWNE, OF CAMBRIDGE, AND EDWIN D. CHAPLIN, OF NATICK, MASSACHUSETTS, ASSIGNORS TO THE AMERICAN LEAD COMPANY, OF KITTERY, MAINE.

APPARATUS FOR MANUFACTURING WHITE LEAD BY ELECTROLYSIS.

SPECIFICATION forming part of Letters Patent No. 551,361, dated December 17, 1895.

Application filed July 2, 1894. Renewed May 18, 1895. Serial No. 549,841. (No model.)

*To all whom it may concern:*

Be it known that we, ARTHUR BENJAMIN BROWNE, of Cambridge, and EDWIN D. CHAPLIN, of Natick, in the county of Middlesex and State of Massachusetts, have invented certain new and useful Improvements in Apparatus for Manufacturing White Lead by Electrolysis, of which the following, taken in connection with the accompanying drawings, is a specification.

Our invention relates to apparatus for the manufacture of white lead by electrolysis; and it consists in certain novel features of construction, arrangement and combination of parts which will be readily understood by reference to the description of the accompanying drawings and to the claims hereto appended and in which our invention is clearly pointed out.

Figure 1 of the drawings is a sectional elevation of a portion of a building and our apparatus arranged therein. Fig. 2 is a plan of the electrolyzer-tanks. Fig. 3 is a central vertical section of the mixing and precipitating globe, and Fig. 4 is a horizontal section of the same on line $x\,x$ of Fig. 3.

In the drawings, A, A', and $A^2$ are a series of electrolyzer-tanks arranged near each other, and at different levels, in which are placed the porous cups B, B', and $B^2$, each provided with a discharge-pipe $b$, $b'$, or $b^2$, which extends therefrom through the wall of its tank, while the tanks A, A', and $A^2$ are respectively provided with the discharge-pipes $a$, $a'$, and $a^2$, all as shown.

C is a filtering-tank located at any convenient distance from the electrolyzer-tank $A^2$ and provided with a horizontal diaphragm C' of any suitable filtering material, and D is a similar receptacle but containing no filtering-diaphragm.

E, E', and $E^2$ are three filters arranged in near proximity to each other and at different levels and provided respectively with the discharge-spouts $c$, $c'$, and $c^2$ and the discharge-pipes 2, 3, and 4, as shown.

F, G, H, I, and J are a series of supply-tanks located preferably upon an upper floor of the building.

L, M, N, O, and P are a series of smaller tanks located above the electrolyzers or at a higher level than the same, and Q is the mixing and precipitating globe, made preferably of glass, so that the operation of precipitation may be readily observed.

The tank F, which contains a solution of nitrate of soda, is provided with two discharge-pipes 5 and 6, the former of which leads to and discharges into the tank L and is provided with a valve 7, by which the flow of the liquid through said pipe may be regulated, while the pipe 6 leads to and discharges into the tank M and is provided with the valve 8 to control the flow of liquid through said pipe.

The tank G is provided with a discharge-pipe 9, having the valve 10, through which the contents of said tank flows into the tank N and through the pipe 11 into the tank L.

The tank L is provided with a ball-cock valve $d$, which stops the flow of liquid from the pipe 11 when the tank L is filled to a certain predetermined level, and the pipe 9 is provided with a ball-cock valve $e$, which in like manner shuts off the supply of liquid to the tank N from the supply-tank G when the tank N is filled to a certain predetermined level.

The tank N is provided with a second ball-cock valve $f$ to control the flow of the nitrate of soda through the pipe 5 into the tank L by the rise and fall of the liquid in the tank N.

The tank H, to contain sodium hydrate, is provided with the discharge-pipe 12 having the valve 13, through which the contents of the tank H flows into the tank O and through the pipe 14 into the tank M, the flow into said tank M being controlled by the ball-cock valve $g$ and into the tank O by the ball-cock valve $h$.

The tank O has a second ball-cock valve $i$, which controls the flow of the nitrate of soda into the tank M.

The tank L is provided with a discharge-pipe 15, which leads to the interior of the outer cell of the electrolyzer A, and the tank M is provided with a similar pipe 15*, which discharges into the interior of the porous cup B, as shown.

The tanks N and O are provided respectively with the pipes 16 and 17, which extend into the interior of the globe Q to about the center of its height and have their lower ends turned into a horizontal or nearly horizontal position and curved into positions parallel or nearly so to the inner wall of said globe, as shown in Figs. 3 and 4.

The pipes 16 and 17 are provided respectively with valves 18 and 19 by which the flow into the globe Q may be regulated or stopped altogether, as may be desired. A pipe 20 leads from the interior of the globe Q to the interior of the tank P near its bottom or below the filtering-diaphragm $j$ located about midway of the height of said tank, as shown. A pipe 21 extends from the interior of the tank P below said diaghragm to and discharges into the filter E and is provided with a valve 22, by which the flow of liquid through said pipe may be regulated or shut off altogether.

R is a pump provided with the suction-pipe 23, which enters the tank P above the filtering-diaphragm $j$, and the pipe 2 communicating with the interior of the filter E, said pipe 2 being provided with a shut-off valve 24. A discharge-pipe 25 extends upward from the pump R to and discharges into the tank F.

S is another pump provided with a suction-pipe 26, extending into the filtering-tank C above the filtering-diaphragm $C'$ and with the discharge-pipe 27 extending upward therefrom and discharging into the tank G.

T is a third pump provided with a suction-pipe 28, communicating with the interior of the tank D, and with the discharge-pipe 29 extending upward therefrom and discharging into the tank H, and is provided with the valve 30 as a means of regulating the flow of the liquid through said pipe.

The tank I, to contain water, is provided with a discharge-pipe 31, which extends to and discharges into the spout $c'$ of the filter $E'$, and the tank J is provided with a similar pipe 32 leading to and discharging into the spout $c$ of the filter E.

U is a drying table or pan, where the final product is dried.

V is a dynamo for furnishing the electric current to the electrolyzers, the negative pole of which is connected by the wire $k$ to the cathode $l$ in the porous cup B, and the positive pole is connected by the wires $m$ and $m'$ to the anodes $n^2$ $n^2$ in the outer cell of the electrolyzer $A^2$, the cathode $l^2$ in the porous cup $B^2$ being connected by the wires $o$ and $o'$ to the anodes $n'$ $n'$ in the outer cell of the electrolyzer $A'$ and the cathode $l'$ in the porous cup B being connected by the wires $p$ and $p'$ to the anodes $n$ $n$ in the outer cell of the electrolyzer A, all as shown in Fig. 1.

The cathodes $l$, $l'$, and $l^2$, which may be plates of lead or other suitable material, are suspended from the tops of the electrolyzer-tanks A, $A'$, and $A^2$, and the anodes $n$, $n'$, and $n^2$, which are pigs of lead, are suspended by hooks $q$, $q'$, and $q^2$ from metal bars $r$, $r'$, and $r^2$, extending across and supported upon the tops of the electrolyzer-tanks A, $A'$, and $A^2$, each bar $r$, $r'$, and $r^2$ supporting a series of pigs, as shown in Fig. 2. The lower end of the pipe 26 is provided with a ball-cock valve $s$ so constructed and arranged that when the float $s'$ thereof is in its lowermost position the valve is closed and when it rises the valve will open.

Any sediment which accumulates in the bottom of the filter-tank C may be drawn off through the pipe 33 by opening the valve 34.

The operation of our apparatus in the manufacture of white lead by electrolysis is as follows: The electrolyzer-tanks A, $A'$, and $A^2$, the porous cups B, $B'$, and $B^2$, and the tank F are first filled with a solution of nitrate of soda, which under the influence of an electric current will separate into nitric acid and sodium hydrate, as stated in the Letters Patent No. 496,109, granted to Arthur Benj. Browne April 25, 1893. If now the dynamo be set in operation and the current of electricity be passed through the electrolyzers the sodium hydrate in each electrolyzer will accumulate about its cathode, while the nitric acid attacks the pigs of lead $n$, $n'$, and $n^2$, forming a solution of nitrate of lead in the outer cells of the electrolyzers. When the separation of the solution in the electrolyzers into sodium hydrate and nitric acid has commenced the valves 7 and 8 are opened and the solution of nitrate of soda contained in the tank F will begin to flow through the pipe 5, the ball-cock tank L, and the pipe 15 into the outer cell of the electrolyzer A, and also through into the porous cup B. When the solution in the electrolyzer A rises to the level of the the pipe 6, ball-cock tank M, and the pipe 15* upper bends in the pipes $a$ and $b$ a mixture of nitrate of lead and nitrate of soda flows through the pipe $a$ into the outer cell of the electrolyzer $A'$, while the mixture of sodium hydrate and nitrate of soda will flow through the pipe $b$ into the porous cup $B'$ of the electrolyzer $A'$, and when the solution in electrolyzer $A'$ rises to the level of the upper bends of the pipes $a'$ and $b'$ the solution will overflow into the electrolyzer $A^2$, as above described, and so continuously through any number of electrolyzers. When the solution in the lost electrolyzer of the series, which in the case illustrated is the electrolyzer $A^2$, rises above the upper bends of the pipes $a^2$ and $b^2$ it overflows through said pipes into the tanks C and D, respectively. The nitrate of lead and nitrate of soda mixture flowing through the pipe $a^2$ enters the tank C below the filtering-diaphragm $C'$ and is filtered by its passage upward through said diaphragm, and as the float $s'$ of the ball-cock $s$ is forced upward by the rise of the solution the ball-cock $s$ will be opened, and if the pump S is operated the nitrate of lead and soda mixture will be pumped upward and discharged into the tank G. The sodium hydrate flowing through the pipe $b^2$ needs no filtering and is allowed to flow into the tank D, from which it is pumped by the pump T through the pipe 29 into the tank H. The tank I is filled with water, supplied thereto in any suitable manner adapted to keep up the supply, and the tank J is charged with a solution of a carbonate of soda, which may be supplied thereto in any suitable manner. The apparatus being now charged is ready to commence the operation of manufacturing white lead for the market. The valves 10 and 13 are now opened, allowing the mixed nitrates of lead and soda to flow from the tank G through the pipe 9 into the tank N, and also through the pipe 11 into the tank L. The tank N fills until the ball-cock valve $e$ is closed by the rising of its float, when the flow of the mixed nitrates of lead and soda into said tank N is stopped, while it continues to flow through the pipe 11 into the tank L until the ball-cock valve $d$ is closed by the rising of its float, when the flow of the nitrates of lead will cease temporarily. At the same time that the ball-cock $e$ is closed by the rising of the solution in the tank N the ball-cock $f$ is closed, thus stopping the flow of the nitrate of soda from the tank F into the tank L. From the tank L the mixed nitrates of lead and soda flow through the pipe 15 into the outer cell of the electrolyzer A, thence through pipe $a$ into the outer cell of the electrolyzer A', thence through pipe $a'$ into the outer cell of the electrolyzer A², and so on through any number of electrolyzers, thence through pipe $a^2$ into the filtering-tank C, from which it is pumped by the pump S through pipes 26 and 27 into the tank G, thus completing the circulation from the tank G back to said tank again, during which more lead has been dissolved as lead nitrate in each of the electrolyzers of the series, and the solution holds more lead nitrate. The sodium hydrate flowing from the tank H through the pipe 12 into the tank O and the pipe 14 into the tank M fills the tank O until the ball-cock $h$ is closed by the rising of its float, and continues to flow into the tank M until the ball-cock $g$ is closed by the rising of its float. The rising of the solution in the tank O that closes the ball-cock $h$ also closes the ball-cock $i$ and shuts off the supply of the nitrate of soda flowing from the tank F through pipe 6 into tank M. The sodium-hydrate solution flows continuously from the tank M through pipe 15* into the porous cup B, thence through pipe $b$ into the porous cup B', thence through pipe $b'$ into the porous cup B² and so through any number of porous cups of the series of electrolyzers and from the last cup of said series through pipe $b^2$ into the tank D, thence through pipe 28, pump T, and pipe 30 into the tank H, having made a complete circulation.

In order to form hydrate of lead it is necessary to mix the sodium hydrate, which has been accumulating, with the nitrate of lead, which has also been accumulating, and in order that it may settle rapidly violent agitation is necessary. This is accomplished by means of the glass globe Q and the pipes 16 and 17, leading from the tanks N and O respectively, constructed and arranged as hereinbefore described. If now the valves 18 and 19 be opened nitrate of lead and sodium hydrate will flow into the globe Q, being agitated by the velocity of the liquids, the shape of the globe and the rotary motion thereby established. The solution of nitrate of soda formed by this precipitation flows through the pipe 20 into the tank P, holding in suspension the precipitated and flocculent particles of lead hydrate, which remain in the bottom of said tank below the filtering-diaphragm $j$ until withdrawn therefrom. The filtered nitrate of soda is pumped by the pump R through pipes 23 and 25 into the tank F to be used over again. Upon opening the valve 22 the lead hydrate in the tank P flows through the pipe 21 into the filter E, where any nitrate of soda still remaining mixed with the lead hydrate is filtered therefrom and is pumped through the pipes 2 and 25 into the tank F. As the lead hydrate is discharged from the filter E into the spout $c$ it is treated with a solution of a carbonate of soda which has been prepared in the tank J and which flows therefrom through the pipe 32 and is discharged into said spout $c$ with the hydrate of lead, which absorbs carbonic acid from the carbonate of soda, as stated in the application of Arthur Benj. Browne, Serial No. 496,411, allowed April 9, 1894, becoming a hydrated carbonate, which is separated from the resulting solution of sodium hydrate in the filtering device E', from which said sodium hydrate is discharged through the pipe 3 and may be allowed to waste, be sold as such, or be reconverted into sodium carbonate. Upon being discharged from the filter E' into the spout $c'$ the hydrated carbonate of lead is washed with water descending from the tank I through the pipe 31. This water with the hydrated carbonate of lead is discharged through the spout $c'$ into the filtering device E², from which the water is discharged through the pipe 4 and allowed to run to waste, and the washed white lead is discharged from said filtering device through the spout $c^2$ upon the drying-table U.

It is obvious that in the operation of precipitation the tanks G and H would become emptied if no means were employed to regulate the flow therefrom and to return thereto portions of the nitrate of lead and sodium hydrate, and as it is found in practice to be desirable to keep a definite amount of solution in all the tanks the ball-cocks $d$, $e$, $f$, $g$, $h$, $i$, and $s$ are provided and are arranged to operate as hereinbefore described, and the pumps R, S, and T are employed to maintain the circulation. When the solutions are drawn through the valves 18 and 19, thereby lowering the solutions in the tanks N and O, respectively, the ball-cocks $e$ and $h$ are opened and the solutions in the tanks G and H flow through them into said tanks N and O in quantities equal to that drawn off through said valves 18 and 19, and thus a constant quantity of solution is maintained in circulation. It is also found in practice to be desirable to maintain a constant quantity of lead in solution. This is accomplished by our system in the following manner: The solutions are allowed to flow from the tanks G and H through the circulation and back to said tanks continuously until the lead-nitrate solution shows the desired density. The valves 18, 19, and 22 are then opened to the necessary extent to draw off a quantity of precipitate equal to the quantity of lead at that time being decomposed in the electrolyzers. At the same time the ball-cocks *f* and *i* are opened and a quantity of solution from tank F equal to the precipitate and the solution in which it was suspended flows through the pipes 5 and 6 and into the circulation.

What we claim as new, and desire to secure by Letters Patent of the United States, is—

1. In apparatus for manufacturing white lead by electrolysis, the combination of an electrolyzer tank; a porous cup in said tank; a cathode in said porous cup; an anode of lead to be decomposed in said tank outside of said porous cup; a source of electric energy; conductors connecting said cathode and anode to opposite poles of said source of electric energy; the supply tanks F and G; the ball cock tanks L and M; pipes 5, 6, 15 and 15*; and the valves 7 and 8, all constructed arranged and operating substantially as described.

2. The combination of an electrolyzer tank; a porous cup in said tank; suitable anodes and cathode in said tank and cup, a source of electric energy; wires connecting said anodes and cathode with the opposite poles of said source of electric energy; the supply tanks F, G, and H; the ball-cock tanks L, M, N and O; pipes leading from tank F to tanks L and M; pipes leading from tank G to the tanks L and N; pipes leading from the tank H to the tanks M and O; the shut off valves 7, 8, 10, and 13; the ball-cock valves *d*, *e*, *f*, *g*, *h* and *i*; the pipe 15 leading from the tank L to the electrolyzer tank; the pipe 15* leading from the tank M to the interior of the porous cup; the precipitating vessel Q; the pipes 16 and 17 leading respectively from the tanks N and O to the interior of said vessel Q; and means for drawing off the precipitated lead hydrate therefrom.

3. The combination of a plurality of electrolyzer tanks arranged at different levels; a porous cup in each of said tanks; a cathode in each cup; suitable anodes, to be decomposed, suspended in each of said tanks; a source of electric energy; wires connecting said cathodes and anodes to the opposite poles of said source of electric energy; the supply tanks F G and H; the precipitating vessel Q; the filter tanks C and P; the receiving tank D; means having provision for conveying the contents of said tanks F G and H to the highest electrolyzer tank and its cup; means having provision for regulating and intermittently stopping the flow of said solutions; means having provision for causing said solutions to flow from the highest to the lowest electrolyzer and thence to the tanks C and D; pipes for conveying the solutions in the tanks G and H to the precipitating vessel Q; means having provision for regulating the supply of solutions to said vessel Q; a pipe leading from the vessel Q to the filter tank P; and means having provision for conveying the nitrate of lead mixture from the filter tank C to the tank G, the sodium hydrate from the tank D to the tank H, and the nitrate of soda from the upper part of the filter tank P to the tank F.

4. The combination of an electrolyzing tank; a porous cup in said tank; a cathode in said cup; anodes, to be decomposed, suspended in said tank; the supply tanks F, G, and H; the filtering devices C, P, E, E', and E²; the precipitating vessel Q; pipes for conveying portions of the contents of said supply tanks to the outer and inner cells of the electrolyzer; means having provision for regulating and stopping the flow of the solutions from said supply tanks to said electrolyzer; pipes for conveying portions of the solutions in the tanks G and H into the precipitating vessel Q; means having provision for controlling the flow of said solutions into said precipitating vessel; a pipe leading from said vessel Q to the interior of the filtering tank P; a discharge pipe from the tank P having its delivery end in the filtering device E; means having provision for causing a flow of the solutions in the electrolyzer therefrom and into the tanks C and D; means having provision for treating the lead hydrate with carbonate of soda as it is being discharged from the filter E into the filter E'; means for washing the white lead as it is discharged from the filter E' into the filter E²; suitable pumps and pipes for conveying the nitrate of lead from the filter C to the tank G, the sodium hydrate from the tank D to the tank H and the nitrate of soda from the filters E and P to the tank F; a dynamo or other source of electric energy; and suitable conducting wires connecting said cathode and anodes to the opposite poles of said source of electric energy.

In testimony whereof we have signed our names to this specification, in the presence of two subscribing witnesses, on this 29th day of June, A. D. 1894.

ARTHUR BENJ. BROWNE.
EDWIN D. CHAPLIN.

Witnesses:
N. C. LOMBARD,
GEO. A. SEWALL.